Aug. 14, 1928.
R. C. DEALE
1,680,731
MAGNETIC SHUNT FOR DYNAMO ELECTRIC MACHINES
Filed April 2, 1926
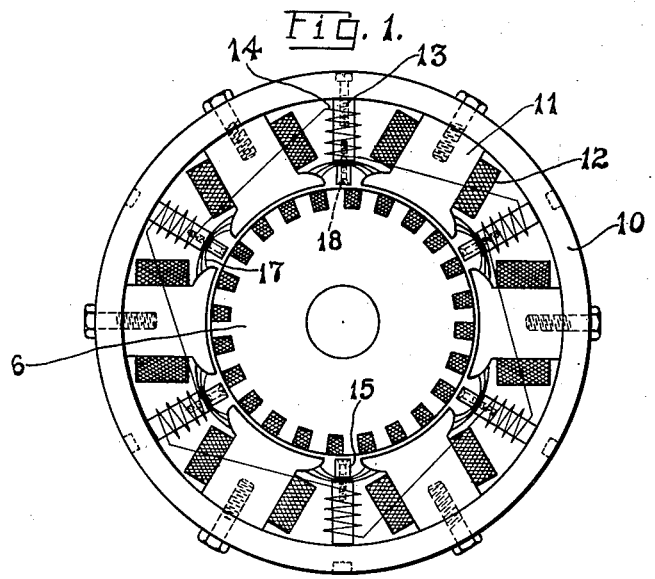
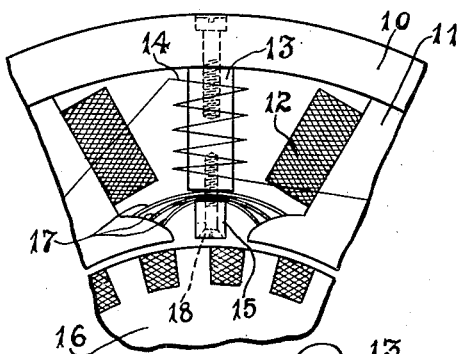
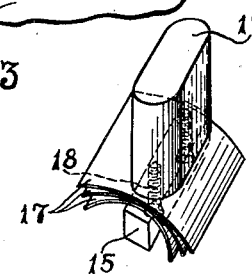
INVENTOR
R.C. Deale.
BY
Joseph K. Schofield
ATTORNEY Patented Aug. 14, 1928.

1,680,731

UNITED STATES PATENT OFFICE.

ROBERT C. DEALE, OF PLAINFIELD, NEW JERSEY, ASSIGNOR TO NILES-BEMENT-POND COMPANY, OF NEW YORK, N. Y., A CORPORATION OF NEW JERSEY.

MAGNETIC SHUNT FOR DYNAMO-ELECTRIC MACHINES.

Application filed April 2, 1926. Serial No. 99,309.

This invention relates to generators and particularly to a generator adapted to operate with its armature circuit constantly and directly connected to the armature circuit of a motor.

An object of the present invention is to provide improved magnetic circuits including a restricted magnetic path for the residual flux of a generator so that a shunt path of limited cross section and permeability is available for the said residual magnetic flux from one magnetic pole to another without passing through the armature.

Another object of importance is that the shunt provided for this magnetic flux due to the residual magnetism is fixed and is formed by inserts, preferably in the form of flexible sheets of magnetic material disposed between and frictionally engaging adjacent pole pieces of opposite polarity.

One feature which is advantageous therefore is that a pole piece, together with its winding, may be removed to repair or replace the winding with a minimum of difficulty and with the assurance that the shunt is again in position and operative when the pole piece is replaced.

Another feature which is advantageous is that the flexible sheets forming the magnetic shunt may be attached to the tips of the interpoles and held in place by the retaining means for the interpole bar.

For driving many equipments such as elevators, hoists, machine tools, etc., it is advisable to have individual, separately excited generators for each driving motor with the armature circuits of each driving motor and generator permanently and directly connected. The driving motors are started in one direction or the other by exciting the field of their generators in one direction or the other and stopped by opening the field circuits of their generators. This avoids the necessity of opening the heavier armature circuits of either the driving motors or their generators. A typical motor control system for a planer is described and claimed in patent to Blood 1,597,396. In this system a planer driving motor is connected to a generator by having its armature circuit connected permanently to the armature circuit of the generator. A motor adapted for the particular source of electricity and the generator form a motor-generator set and are rotated at constant speed and in the same direction. The planer motor whose armature circuit is connected to the armature circuit of the generator is reversed by a switch effecting a reversal of the shunt field circuit of the generator. This switch, in the above mentioned patent, is moved from one operative position to the other by dogs on the reciprocating planer table. With the switch in its mid or neutral position and the generator field open, residual magnetism in the pole pieces of the generator may be and frequently is sufficiently strong to cause a voltage to be generated sufficient to slowly rotate the planer motor and thus cause a creeping movement of the planer table. To prevent the residual magnetism of the generator shown in the patent from causing this creeping action when its field circuit is open, a momentary current is passed through the generator field circuit in the reverse direction. This eliminates or materially reduces the magnetization of the generator poles and so prevents any voltage being produced. This manner of eliminating the effects of residual magnetism is not wholly satisfactory, as the demagnetizing current may be too weak or too strong, or maintained for too long or too short a time. It also requires special switch contacts for its circuit which adds complications to the required mechanism.

Applicant has therefore devised the present construction to eliminate the effects of residual magnetism without requiring the addition of any external circuits or adjustments.

With these and other objects in view, my invention consists in the features of construction and operation set forth in the following specification and illustrated in the accompanying drawing.

In the accompanying drawing annexed hereto and forming a part of this specification, I have shown my invention embodied in a generator adapted for operating a planer motor, but it will be understood that the invention can be otherwise embodied and that the drawings are not to be construed as defining or limiting the scope of the invention, the claims appended to this specification being relied upon for that purpose.

In the drawing:

Figure 1 is a transverse view of a generator provided with the magnetic shunt forming the present invention.

Fig. 2 is an enlarged view of a portion of a generator showing the magnetic shunt more clearly, and Fig. 3 is an isometric view of a shunt attached to its interpole.

In the above mentioned drawing I have shown but one embodiment of the invention which is now deemed preferable, but it is to be understood that changes and modifications may be made within the scope of the appended claims without departing from the spirit of the invention.

Briefly, and in its broadest aspect, my invention comprises a generator or other dynamoelectric machine having flexible sheets of magnetic material, these sheets being adapted to be placed in the spaces between adjacent pole pieces and substantially enclosing the armature therewithin.

Referring more in detail to the figures of the drawing, I show a generator having a frame 10 to which are attached pole pieces 11 on which are mounted shunt field windings 12. Between the pole pieces 11 are the interpoles 13 on which are small series field windings indicated diagrammatically at 14. On the inner free ends of the interpoles 13 are the cross bars 15. Within the pole pieces 11 and 13 an armature 16 is adapted to rotate. As all of the above mentioned parts are, or may be, of well-known and standard construction, further description is not thought to be necessary.

As will be seen, the tips of the pole pieces 11 are extended laterally and are adapted to engage the sheets or laminations of magnetic material 17 forming the magnetic shunt path for the residual flux between adjacent pole pieces 11. For this purpose the sheets of magnetic material 17 which may be of a material such as iron or steel, and preferably flexible, are inserted within the space between and engage adjacent pole pieces of the generator. Preferably two or more laminations 17 are provided frictionally and resiliently held against the end surfaces of the pole pieces and held in place by means of screws 18 attached to the bars 15 on the inner ends of the interpoles 13. These laminations therefore press resiliently against the tips of the pole pieces 11. These shunt pieces also closely surround the generator armature 16 and provide a permanently closed magnetic path between the adjacent pole pieces of the generator without the flux being required to pass through the armature 16. The shunt pieces 17 are preferably made of sufficient width to extend throughout the width of the pole pieces 11 and the coils of the armature 16.

The area in cross section of the shunt pieces is limited so that they are substantially saturated by the flux due to the residual flux in the pole pieces 11. This, in the circuits for a planer operating system, has been found to be equal to approximately one to two per cent of the cross sectional area of the pole pieces 11. Under normal operation of the planer the amount of flux passing through this shunt path is relatively small on account of the limited cross section and permeability of the laminations 17 and is therefore not sufficient to adversely effect the operating efficiency of the system.

As the sheets 17 of magnetic material forming the shunts are attached to the interpoles 13, any flux set up by their series winding is shunted away from the armature.

What I claim is:

1. The combination with a dynamoelectric machine of a magnetic shunt comprising a flexible sheet of magnetic material having limited permeability positioned between and adapted to resiliently but permanently engage magnetic pole pieces of opposite polarity whereby flux due to residual magnetism may be shunted around the armature of said electric machine.

2. The combination with a dynamoelectric machine of a magnetic shunt comprising a plurality of superposed sheets of magnetic material positioned between and adapted to resiliently but permanently engage adjacent pole pieces whereby flux due to residual magnetism may be shunted around the armature of said electric machine.

3. The combination with a dynamoelectric machine of a magnetic shunt comprising a plurality of superposed sheets of magnetic material extending substantially throughout the width of the pole pieces positioned between and adapted to resiliently but permanently engage adjacent pole pieces whereby flux due to residual magnetism may be shunted around the armature of said electric machine.

4. The combination with a dynamoelectric machine having a plurality of pairs of magnetic pole pieces and interpoles between adjacent pole pieces, of a magnetic shunt comprising sheets of magnetic material positioned between and adapted to engage adjacent pole pieces, said sheets being attached at their mid portions to said interpoles.

5. The combination with a dynamoelectric machine of a magnetic shunt comprising magnetic material of limited cross sectional area positioned between and adapted to engage magnetic pole pieces of opposite polarity, the cross sectional area and permeability of said material being such that it is substantially saturated by the flux due to residual magnetism in said pole pieces.

6. The combination with a dynamoelectric machine of a magnetic shunt having a plurality of pairs of magnetic pole pieces and interpoles between adjacent pole pieces, comprising magnetic material of limited cross sectional area positioned between and adapted to engage adjacent pole pieces, the cross sectional area and permeability of said material being such that it is substantially saturated by the flux due to residual magnetism in said pole pieces, said material being attached at its mid portions to said interpoles.

7. The combination with a dynamoelectric machine of a magnetic shunt comprising magnetic material having limited permeability positioned between and adapted to engage magnetic pole pieces of opposite polarity, interpoles having series windings thereon, and means to attach said shunt to said interpoles, whereby flux due to residual magnetism in said pole pieces and said series windings on said interpoles may be shunted around the armature of said electric machine.

In testimony whereof, I hereto affix my signature.

ROBERT C. DEALE.